(12) United States Patent
Liu et al.

(10) Patent No.: US 10,417,084 B2
(45) Date of Patent: Sep. 17, 2019

(54) METHOD AND APPARATUS FOR MANAGING DEVICE FAILURE

(71) Applicant: EMC IP Holding Company LLC, Hopkinton, MA (US)

(72) Inventors: Vincent Yin Liu, Chengdu (CN); Patrick Minggang Lu, Shanghai (CN); Charlie Chao Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 128 days.

(21) Appl. No.: 15/460,086

(22) Filed: Mar. 15, 2017

(65) Prior Publication Data
US 2017/0269983 A1     Sep. 21, 2017

(30) Foreign Application Priority Data

Mar. 15, 2016   (CN) .......................... 2016 1 0148027

(51) Int. Cl.
*G06F 11/07*      (2006.01)
*H04L 12/24*      (2006.01)

(52) U.S. Cl.
CPC ........ *G06F 11/0793* (2013.01); *G06F 11/079* (2013.01); *G06F 11/0709* (2013.01); *H04L 41/00* (2013.01); *H04L 41/069* (2013.01); *H04L 41/0636* (2013.01); *H04L 41/0681* (2013.01)

(58) Field of Classification Search
CPC combination set(s) only.
See application file for complete search history.

(56) References Cited

U.S. PATENT DOCUMENTS

| 5,528,516 | A | * | 6/1996 | Yemini | G06F 11/2257 |
| | | | | | 702/181 |
| 6,985,779 | B2 | * | 1/2006 | Hsiung | G05B 15/02 |
| | | | | | 700/19 |
| 2003/0149919 | A1 | * | 8/2003 | Greenwald | G06F 11/2257 |
| | | | | | 714/43 |
| 2007/0028220 | A1 | * | 2/2007 | Miller | G05B 23/0278 |
| | | | | | 717/124 |

* cited by examiner

*Primary Examiner* — Amine Riad
(74) *Attorney, Agent, or Firm* — Brian J. Colandreo; Mark H. Whittenberger; Holland & Knight LLP (57) ABSTRACT

Embodiments of the present disclosure relate to a method and apparatus for managing a failure of a device. The method comprises detecting whether a failure occurs in a device, and generating a failure report for the failure in response to the failure occurring in the device. The method further comprises querying a device object repository with the failure report, and the object device repository stores historical failure information associated with the device and a fix solution corresponding to the historical failure information. The method further comprises obtaining the fix solution from the device object repository based on a comparison between the failure report and the historical failure information. Embodiments of the present disclosure can manage the failure of the device more effectively.

15 Claims, 5 Drawing Sheets

METHOD AND APPARATUS FOR MANAGING DEVICE FAILURE

RELATED APPLICATIONS

This application claim priority from Chinese Patent Application Number CN201610148027.4, filed on Mar. 15, 2016 at the State Intellectual Property Office. China, titled "METHOD AND APPARATUS FOR MANAGING FAILURE OF DEVICE," the contents of which is herein incorporated by reference in its entirety

FIELD

Embodiments of the present disclosure generally relate to the field of the device management, and more specifically, to a method and apparatus for managing a failure of a device.

BACKGROUND

A data center is a large place including various devices. The development of information technology has witnessed the exponential growth of the scale of the data center and an increasing number of devices (for example, servers, routers, switchers, storage devices, and the host machine bus adapter and so on) installed in the data center. Due to the growing number of the devices, device management in the data center becomes more and more complicated, and the resource consumption keeps increasing.

Traditionally, if a device in the data center fails, that is, a failure occurs in the device, the failure is generally analyzed separately and fixed according to the human experience. However, since the device failure is generally very complicated and varies from each other, failure fixing requires a large amount of human operations and professional technical knowledge. Meanwhile, some failures are recurrent, and separate analysis is conducted repetitively.

SUMMARY

Embodiments of the present disclosure provide a method and apparatus for managing a failure of a device, which can manage the failure of the device in the data center more quickly and automatically.

According to an aspect of the present disclosure, there is disclosed a method for managing device failure. The method comprises: detecting whether a failure occurs in a device; in response to the failure occurring in the device, generating a failure report for the failure; querying a device object repository with the failure report, wherein the object device repository stores historical failure information associated with the device and a fix solution corresponding to the historical failure information; and obtaining the fix solution from the device object repository based on a comparison between the failure report and the historical failure information.

According to another aspect of the present disclosure, there is disclosed an apparatus for managing device failure. The apparatus comprises: a detecting unit configured to detect whether a failure occurs in a device; a generating unit configured to generate a failure report for the failure in response to the failure occurring in the device; a querying unit configured to query a device object repository with the failure report, wherein the object device repository stores historical failure information associated with the device and a fix solution corresponding to the historical failure information; and an obtaining unit configured to obtain the fix solution from the device object repository based on a comparison between the failure report and the historical failure information.

According to still another aspect of the present disclosure, there is disclosed an apparatus for managing device failure. The apparatus comprises a memory and a processor coupled to the memory. The processor is configured to: detect whether a failure occurs in a device; generate a failure report of the failure in response to the failure occurring in the device; query the device object repository with the failure report, the object device repository storing historical failure information associated with the device and a fix solution corresponding to the historical failure information; and obtain the fix solution from the device object repository based on a comparison between the failure report and the historical failure information.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

DETAILED DESCRIPTION OF EMBODIMENTS

Various example embodiments of the present disclosure will be described in detail with reference to the accompanying drawings. The flow diagrams and block diagrams in the accompanying drawings illustrate system architecture, functions, and operations which are possibly implemented by the method and system according to various embodiments of the present disclosure. It should be understood that each block in the flow diagrams or block diagrams may represent a unit, a program segment, or a part of code; the unit, program segment, or part of code may include one or more executable instructions for implementing logical functions as prescribed in various embodiments. It should also be noted that in some alternative embodiments, the functions indicated in the blocks may also occur in a sequence different from what is indicated in the drawings. For example, two consecutively expressed blocks actually may be executed substantially in parallel, or they sometimes may be executed in a reversed order, dependent on the involved functions. Likewise, it should be noted that each block in the flow diagrams and/or block diagrams, and a combination of blocks in the flow diagrams and/or block diagrams, may be implemented using a specific hardware-based system that performs prescribed functions or operations, or may be implemented using a combination of specific hardware and computer instructions.

It should be understood that these example embodiments are only provided for enabling those skilled in the art to better understand and then further implement embodiments of the present disclosure, which are not intended to limit the scope of the present invention in any manner.

Embodiments of the present disclosure disclose a management approach for Device Object Modeling (DOM), and all the devices in a data center or a machine room are modeled in an object-oriented approach. Each device object includes some attributes, including but not limited to, a unique identifier (ID) of the device, a type of the device, a vendor of the device, a position of the device, and so on. Furthermore, each device object may include the operating status information of the device and the historical failure information of the device and so on.

Figure 1:
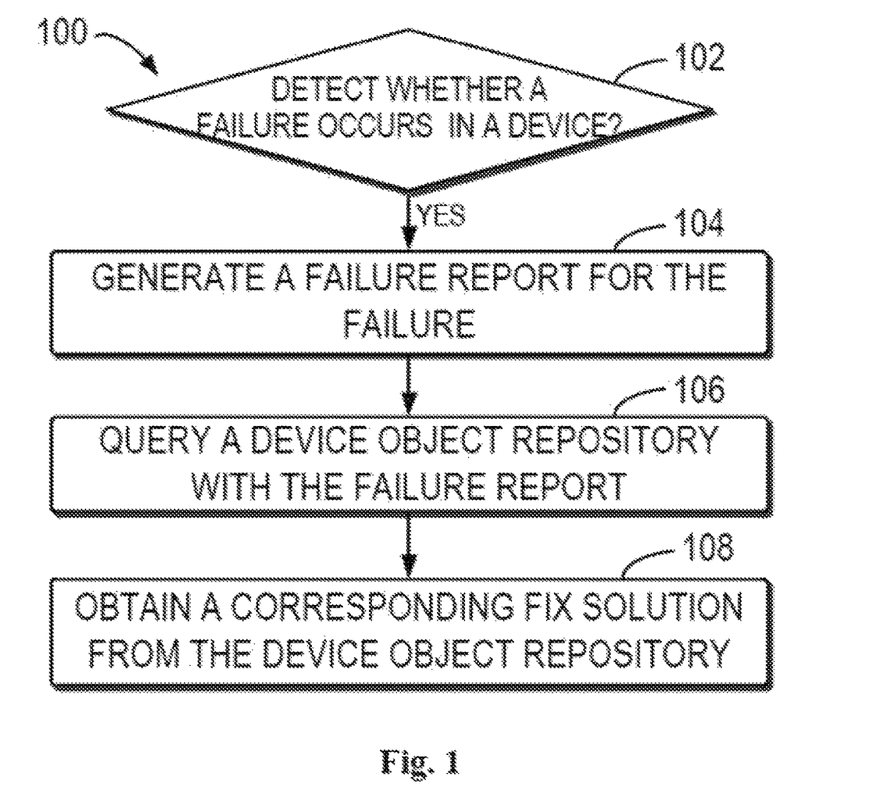
FIG. 1 is a flow diagram illustrating a method for managing a failure of a device according to embodiments of the present disclosure.

FIG. 1 illustrates a flow diagram illustrating a method 100 for managing a failure of a device according to embodiments of the present disclosure. At 102, it is detected whether a failure occurs in a device. For example, all the devices or a part of the devices in the data center or the machine room may be detected manually or automatically to determine whether one or more failures occur. The failure(s) of the device(s) may be managed by a task management system in which one task may represent a device failure event. In an embodiment, the device is detected whether a failure occurs after a new task is generated in the task management system by an administrator. In another embodiment, the device can be detected periodically whether a failure occurs, and if the failure occurs, a new task is generated in the task management system.

In some embodiments, the operating status information (for example, the health status information representing the normal operating status of each device) of the device may be obtained, and it can be determined whether a failure occurs in the device based on the operating status information. The failure of the device may be a software failure or a hardware failure. The software failure may include, for example, a software error, a file damage, a data exchange error, a capacity error and an error of the operating system and so on. The hardware failure may include, for example, a power source failure, a component failure (for example, a hard disk failure and a mainboard failure), a connection failure and so on.

At 104, if the failure occurs in the device, a failure report for the failure is generated. For example, if the device fails, diagnostic analysis is performed for the failure, and a failure report is generated. The failure report may include information describing various types of the device failures, including but not limited to, a failure code, a log of the failure, an identifier of the device, a type of the device, a vendor of the device, and IP address of the device, a position of the device and so on.

In some embodiments, though a failure occurs in a certain device, the root cause of the failure may not be this certain device, but another device(s). As such, for a device failure, correlation analysis between the device and another device (for instance, Apriori algorithm analysis) may be performed in order to determine a root device causing the failure. For instance, if a server A has a network failure, the root cause of the network failure may be the failure of a switch B. Through the correlation analysis, an overall analysis between devices in the data center can be realized, thereby improving the efficiency of failure analysis.

At 106, the device object repository is queried with failure report, and the object device repository stores historical failure information associated with the device and the corresponding fix solution. In some embodiments, the failure code in the failure report may be used as a keyword for querying in the device object repository. Alternatively, a combined query may be performed with the type of the device, the vendor of the device and the failure code of the failure.

At 108, a corresponding fix solution is obtained from the device object repository based on a comparison between the failure report and the historical failure information. Through the query in the device object repository, the historical failure information that is most relevant to the failure can be retrieved, and the fix solution corresponding to the most relevant historical failure information may be obtained from the device object repository.

In some embodiments, a matching degree between the detected failure information in the failure report and each piece of the historical failure information may be determined, and the particular historical failure information that has the highest matching degree in the historical failure information are determined. Then, a fix solution corresponding to the particular historical failure information is obtained from the device object repository. In other words, the failure information is matched with each piece of historical failure information and the fix solution of the historical failure information with the highest matching degree is selected. In some cases, if the fix solution with the highest matching degree cannot fix the failure, the failure may be sent to the technical professional to be specially treated. In some embodiments, a matching degree threshold can be configured. For example, all the historical failure information with a matching degree that is higher than the matching degree threshold may be considered as the relevant failure information. In some embodiments, the matching degree includes a plurality of sub-matching degrees which include at least two of the following: a type matching degree, a vendor matching degree, a failure code matching degree and a failure log matching degree. For example, each sub-matching can be configured with different weights. For instance, if the relevancy of the failure code is most Importance, a weight of the failure code matching degree is configured as 0.4, and if the relevancy of the vendor is not so important comparatively, and a weight of the vendor matching degree is configured as 0.2.

In some embodiments, after obtaining the fix solution, the failure can be fixed with the fix solution. For example, the device is re-detected whether the failure still exists, and if no failure exists, the task is closed. That is to say, once the failure is fixed, the task corresponding to the failure is closed immediately, which facilitate the task management of all the devices in the data center thorough the task management system. In some embodiments, once the task is closed, the fix solution of the failure and the failure information are stored in the device object repository so that the content in the device object repository is added dynamically, and thus the following-up failure management of the device in the data center may be facilitated.

In some embodiments, the operating status information of all the devices may be obtained from the task management module for display so that the operating status information of all the devices may be seen directly from the dashboard. In some embodiments, all the historical failure information in the device object repository may be analyzed in order to predict failures of all the devices involved in the device object repository. For example, since some devices fail frequently, more attention may be paid to monitor the operating status information of the devices and some actions may be taken to prevent the occurrence of failure.

Figure 2:
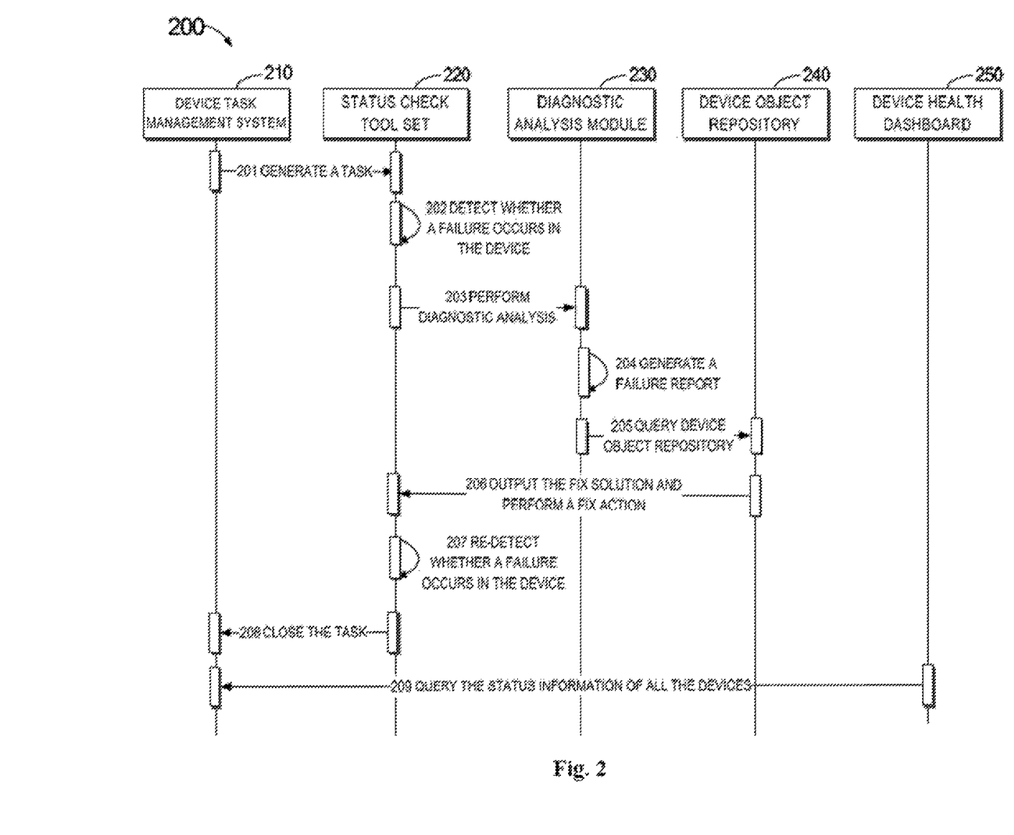
FIG. 2 is a flow diagram illustrating a method for manually managing a failure of a device manually according to embodiments of the present disclosure.
Figure 3:
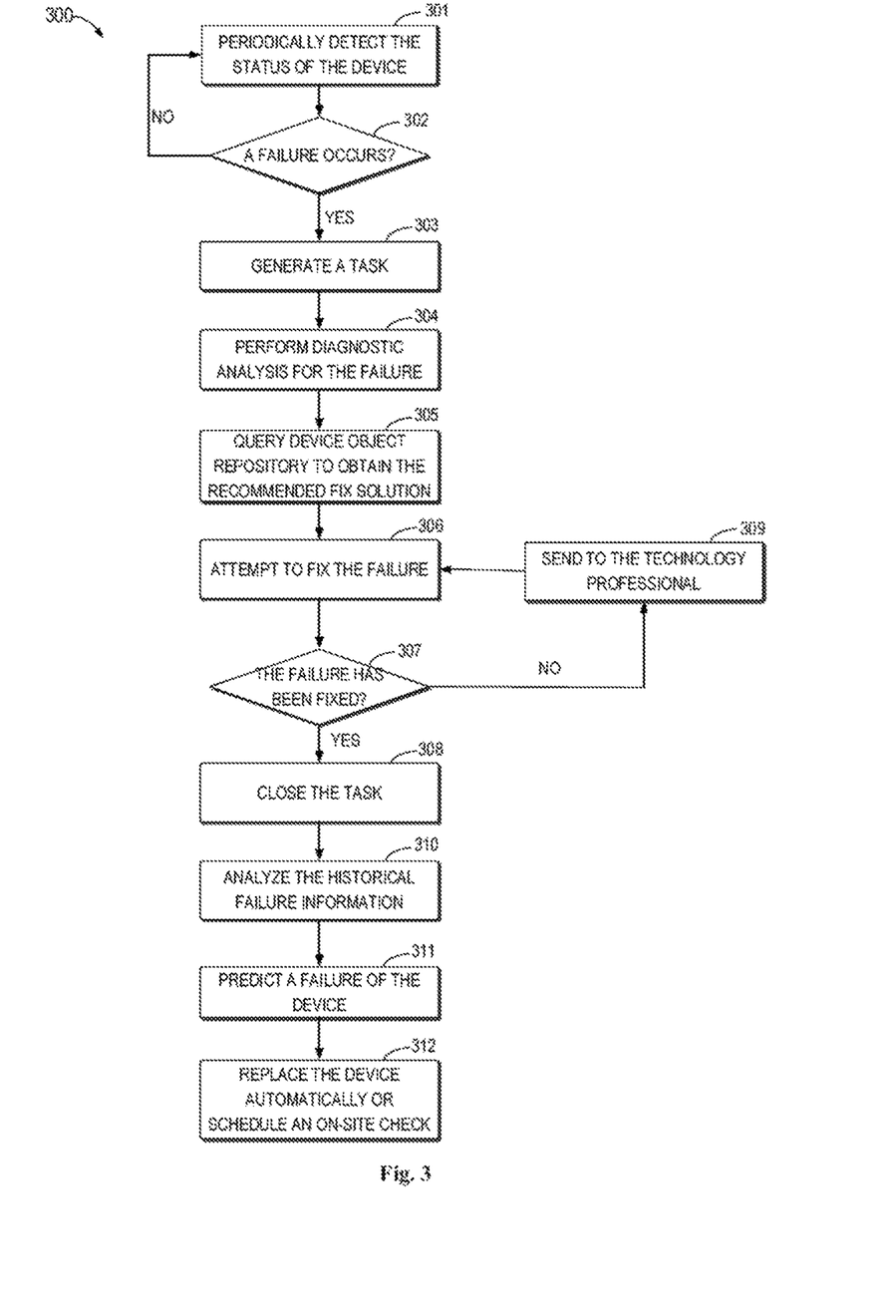
FIG. 3 is a flow diagram illustrating a method for automatically managing a failure of a device according to embodiments of the present disclosure.

In some embodiments, the method for managing a failure of a device may be implemented manually or automatically with the following five components, for example, a Device Task/Ticket Management System (DTMS) 210, a Status Check Tool Set (SCTS) 220, a Diagnostic Analysis Module (DAM) 230, a Device Object Repository (DOR) 240 and a Device Health Dashboard (DHD) 250. However, embodiments of the present disclosure are not necessarily limited to the five components described above.

The DTMS 210 is a management system for managing all the hardware in the data center. The administrator of the data center can manage the device and the status of the device through the DTMS 210. If a device possibly has a failure, the DTMS 210 generates a new task and triggers the SCTS 220 to detect whether the failure occurs in the device. Furthermore, if the failure is fixed, the SCTS 220 runs again to check whether the failure still exists in the device, and closes the newly generated task automatically if no failure exists in the device.

The SCTS 220 is a validation set for various devices (for example, routers, switchers and so on), and the validation set may be maintained dynamically. For example, if the data center is equipped with a new device, the validation set for the new device is added to the SCTS 220. The SCTS 220 may run on various devices and report the healthy status of the device. If the SCTS 220 detects a failure, it reports the failure information to the DAM 230 for a further analysis.

The DAM 230 is an intelligent analysis module, which may analyze the failure information received by SCTS 220 and generate the failure report. The failure report can include an identifier of the device, a type of the device, a vendor of the device, a position of the device, a failure code of the failure, a failure log and so on. The DAM 230 can query DOR 240 with the information in the failure report and return the matched fix solution to the manager so as to fix the device failure.

The DOR 240 is a data warehouse including historical failure information of a plurality of hardware devices, and the historical failure information may be added automatically or manually so that the fix solution for fixing the failure can be reused. Each device in the data center can be considered as an object having various attributes, for example, a unique identifier of the device, a type of the device, a vendor of the device, a position of the device, status information of the device, historical failure information of the device and so on. The DOR 240 provides an external query to provide a recommended fix solution. In DOR 240, the historical failure information is stored in association with the fix solution corresponding to historical failure information. An example DOR 240 is shown in the following table:

TABLE 1 an example Device Object Repository

| | |
|---|---|
| Device identifier | 123456789 |
| Device type | HBA |
| Device vendor | Cisco |
| Operating status of the device | Good |
| Historical failure information | Event XXX, YYY |

The DHD 250 is a display module that can display information related to all the devices. The status information of all the devices may be obtained from the DHD 250. It should to be understood, although the DHD 250 is shown as a separate module, the DHD 250 may be integrated into the DTMS 210.

FIG. 2 illustrates a flow diagram of a method 200 for manually managing a failure of a device according to embodiments of the present disclosure. At 201, the DTMS 210 generates a task. At 202, the SCTS 220 detects whether a failure occurs in the device. At 203, if the failure occurs in the device, the DAM 230 performs the failure diagnostic analysis and generates a failure report at 204. At 205, DAM 230 queries the device object repository 240 with the failure report. Next, at 206, the device object repository 240 returns the recommended fix solution with which the administrator performs the fixing. After the failure has been fixed, at 207, the SCTS 220 verifies whether the fixing succeeds and re-detects whether the failure still exists in the device. If the failure has been fixed, the task is closed at 208, for example, the task is closed automatically. Alternatively, at 209, the DHD 250 may send a query request to the DTMS 210 to display the status information of all the devices in the data center.

FIG. 3 illustrates a flow diagram of a method 300 for automatically managing a failure of a device according to embodiments of the present disclosure. At 301, the status of the device is detected periodically on all the devices or a part of devices in the data center. At 302, it is determined whether a failure occurs in the device. If not, the status of the device continued to be detected periodically. Otherwise, the task management is performed in DTMS 210 at step 303, for example, a task of a failure event is generated. Next, at 304, the diagnostic analysis for the failure is performed. At 305, the device object repository 240 is queried based on the analyzed result (for example, failure report) in order to obtain the recommended fix solution. The failure is attempted to be fixed according to the recommended fix solution at 306. At 307, it is determined whether the failure has been fixed. If so, the task is closed automatically at 308. Otherwise, the failure is sent to the technical professional at 309.

At 310, after the failure has been fixed, the historical failure information in the device object repository can be analyzed. At 311, failures of all the devices in the device object repository are predicted. For instance, for the devices that frequently fail, more attention should be paid to the operating status information of the devices and some actions should be taken to prevent the occurrence of the failures. Then, at 312, the devices that fail frequently and have reached the service life threshold may be replaced automatically. Alternatively, if some devices fail frequently and are predicted to have new failure, the vendors of the devices may be notified for on-site check.

Figure 4:
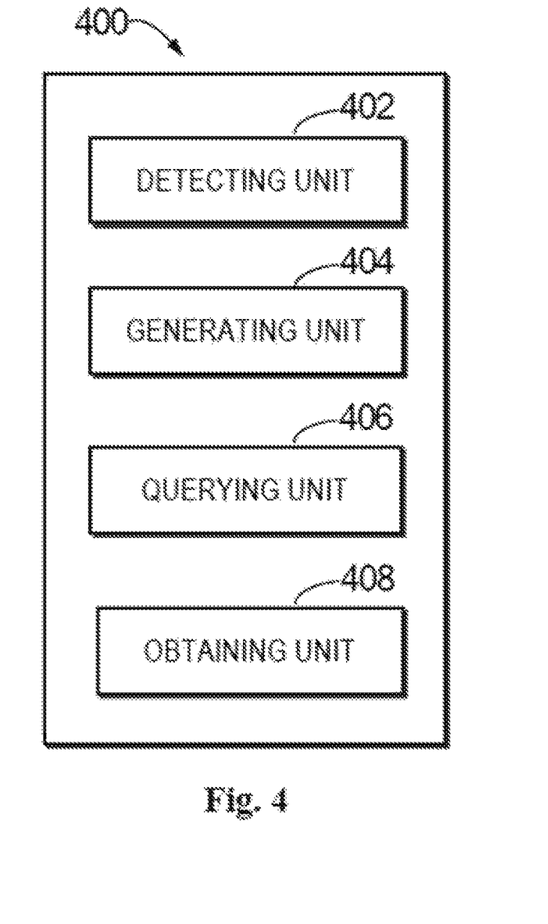
FIG. 4 is a block diagram illustrating an apparatus for managing a failure of a device according to embodiments of the present disclosure.

FIG. 4 illustrates a block diagram of an apparatus 400 for managing a failure of a device according to embodiments of the present disclosure. The apparatus 400 comprises a detecting unit 402 configured to detect whether a failure occurs in a device. The apparatus 400 further comprises a generating unit 404 configured to generate a failure report for the failure in response to the failure occurring in the device. The apparatus 400 further comprises a querying unit 406 configured to query a device object repository with the failure report, and the object device repository stores historical failure information associated with the device and a fix solution corresponding to the historical failure information. The apparatus 400 further comprises an obtaining unit 408 configured to obtain the fix solution from the device object repository based on a comparison between the failure report and the historical failure information.

In an embodiment, the detecting unit 402 is further configured to detect whether the failure occurs in the device in response to generating a new task in a task management module. In another embodiment, the detecting unit 402 is further configured to periodically detect whether the failure occurs in the device, and to generate a new task in a task management module in response to the failure occurring in the device. In another embodiment, the detecting unit 402 is further configured to obtain operating status information of the device; and determine whether the failure occurs in the device based on the operating status information.

In an embodiment, the generating unit 404 is further configured to: perform, for the failure, correlation analysis between the device and another device; and determine a root cause of the failure based on a result of the correlation analysis. In another embodiment, the failure report includes at least one of the following: a failure code of the failure, a log of the failure, an identifier of the device, a type of the device, a vendor of the device and a location of the device.

In an embodiment, the obtaining unit 408 is further configured to: determine a matching degree between failure information in the failure report and the historical failure information; and in response to the matching degree being above a predetermined threshold, obtain the fix solution from the device object repository. In another embodiment, the matching degree includes a plurality of sub-matching degrees which include at least two of the following: a type matching degree, a vendor matching degree, a failure code matching degree and a failure log matching degree.

In an embodiment, the apparatus 400 further includes a re-detecting unit configured to: fix the failure according to the fix solution in response to obtaining the fix solution from the device object repository; re-detect whether the failure exists in the device, and in response to no failure occurring in the device, automatically close the task. In another embodiment, the apparatus 400 further includes: a display unit configured to obtain operating status information of a plurality of devices from the task management module for display. In another embodiment, apparatus 400 further includes a predicting unit configured to: analyze the historical failure information in the device object repository; and predict a potential failure based on the analysis.

Therefore, embodiments of the present disclosure can achieve faster and more automatic failure management of the device. Moreover, embodiments of the present disclosure can obtain the most relevant fixing suggestion quickly and accurately by matching with historical failure information, thereby not only reducing labor cost but also improving efficiency of device failure fixing. Furthermore, some embodiments of the present disclosure can predict the failure condition of the device so as to prevent and make plans for device failure.

Figure 5:
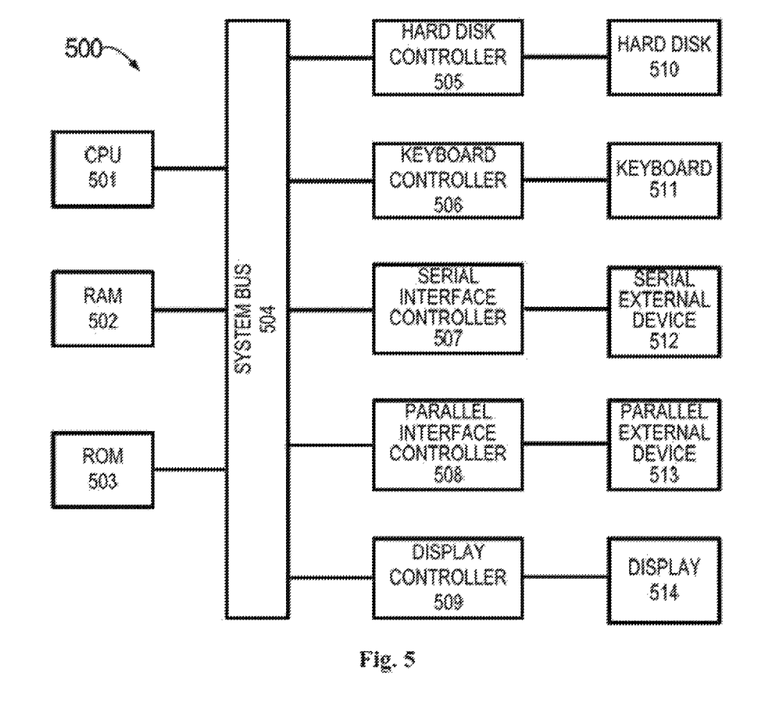
FIG. 5 is a block diagram illustrating a computer device in which a method for managing a failure of a device according to embodiments of the present disclosure may be implemented.

In the following description, a computer device in which the method for managing a failure of a device according to the present disclosure can be implemented is described with reference to FIG. 5. FIG. 5 illustrates a block diagram of a computer device 500 in which the method for managing a failure of a device according to embodiments of the present disclosure may be implemented.

The computer device shown in FIG. 5 comprises a CPU (Central Processing Unit) 501, a RAM (Random Access Memory) 502, a ROM (Read Only Memory) 503, a system bus 504, a hard disk controller 505, a keyboard controller 506, a serial interface controller 507, a parallel interface controller 508, a display controller 509, a hard disk 510, a keyboard 511, a serial external device 512, a parallel external device 513 and a display 514. In these devices, what are coupled to the system bus 504 include the CPU 501, the RAM 502, the ROM 503, the hard disk controller 505, the keyboard controller 506, a serial interface controller 507, a parallel interface controller 508, and a display controller 509. The hard disk 510 is coupled to the hard disk controller 505, the keyboard 511 is coupled to the keyboard controller 506, the serial external device 512 is coupled to the serial interface controller 507, the parallel external device 513 is coupled to the parallel interface controller 508, and the display 514 is coupled to the display controller 509. It should be understood that the structural block diagram as shown in FIG. 5 is only illustrated for example purposes, not for limiting the scope of the present invention. In some cases, some devices may be added or reduced according to the needs. Embodiments of the present disclosure may be stored as computer program codes in a storage device such as the hard disk 510 on the computer. The computer program codes, when loaded into, for example, a storage device to run, cause the CPU 501 to perform the method for managing a failure of a device according to embodiments of the present disclosure.

The above descriptions are only optional embodiments, not intended to limit the present disclosure. To those skilled in the art, embodiments of the present disclosure may have various modifications and variations. Any modifications, equivalent replacements, and improvements within the spirit and principle of subject matter described herein should be included within the protection scope of embodiments of the present disclosure.

Although embodiments of the present disclosure have been described with reference to various embodiments, it should be understood that embodiments of the present disclosure are not limited to the disclosed embodiments. Embodiments of the present disclosure are intended to cover various modifications and equivalent arrangements included in the spirit and scope of the appended claims. The scope of the appended claims meets the broadest explanations and covers all such modifications and equivalent structures and functions.

We claim:

1. A method for managing a failure of a device, comprising:
    detecting whether a failure occurs in the device including:
        periodically detecting whether the failure occurs in the device; and
        in response to the failure occurring in the device, generating a new task in a task management module, the task management module being used to manage status of the device;
    in response to the failure occurring in the device, generating a failure report for the failure;
    querying a device object repository with the failure report, the device object repository storing historical failure information associated with the device and a fix solution corresponding to the historical failure information;
    obtaining the fix solution from the device object repository based on a comparison between the failure report and the historical failure information;
    in response to obtaining the fix solution from the device object repository, fixing the failure according to the fix solution;
    re-detecting whether the failure occurs in the device; and
    in response to no failure occurring in the device, automatically closing the new task.

2. The method according to claim 1, wherein the detecting whether a failure occurs in a device comprises:

in response to generating a new task in a task management module, detecting whether the failure occurs in the device, the task management module being used to manage status of the device.

3. The method according to claim 1, wherein the detecting whether a failure occurs in a device further comprises:
obtaining operating status information of the device; and
determining whether the failure occurs in the device based on the operating status information.

4. The method according to claim 1, wherein the generating the failure report of the failure comprises:
performing, for the failure, a correlation analysis between the device and another device; and
determining a root cause of the failure based on a result of the correlation analysis.

5. The method according to claim 4, wherein the failure report includes at least one of the following:
a failure code of the failure, a log of the failure, an identifier of the device, a type of the device, a vendor of the device and a location of the device.

6. The method according to claim 1, wherein the obtaining the fix solution from the device object repository comprises:
determining a matching degree between failure information in the failure report and the historical failure information; and
in response to the matching degree being above a predetermined threshold, obtaining the fix solution from the device object repository.

7. The method according to claim 6, wherein the matching degree includes a plurality of sub-matching degrees, the plurality of sub-matching degrees including at least two of the following: a first matching degree related to a type, a second matching degree related to a vendor, a third matching degree related to a failure code, and a fourth matching degree related to a failure log.

8. The method according to claim 1, further comprising:
obtaining operating status information of a plurality of devices from the task management module for display, the device being included in the plurality of devices.

9. The method according to claim 1, further comprising:
analyzing the historical failure information in the device object repository; and
predicting a potential failure based on a result of the analysis.

10. A system, comprising:
a data storage system; and
computer-executable program logic encoded in memory of one or more computers enabled to manage a failure of a device, wherein the computer-executable program logic is configured for the execution of:
detecting whether a failure occurs in the device including:
periodically detecting whether the failure occurs in the device; and
in response to the failure occurring in the device, generating a new task in a task management module, the task management module being used to manage status of the device;
in response to the failure occurring in the device, generating a failure report for the failure;
querying a device object repository with the failure report, the device object repository storing historical failure information associated with the device and a fix solution corresponding to the historical failure information;
obtaining the fix solution from the device object repository based on a comparison between the failure report and the historical failure information;
in response to obtaining the fix solution from the device object repository, fixing the failure according to the fix solution;
re-detecting whether the failure occurs in the device; and
in response to no failure occurring in the device, automatically closing the new task.

11. The system of claim 10, wherein the detecting whether a failure occurs in a device comprises:
in response to generating a new task in a task management module, detecting whether the failure occurs in the device, the task management module being used to manage status of the device.

12. The system of claim 10, wherein the detecting whether a failure occurs in a device further comprises:
obtaining operating status information of the device; and
determining whether the failure occurs in the device based on the operating status information.

13. A computer program product for managing a failure of a device, the computer program product comprising:
a non-transitory computer readable medium encoded with computer-executable code, the code configured to enable the execution of:
detecting whether a failure occurs in a device including:
periodically detecting whether the failure occurs in the device; and
in response to the failure occurring in the device, generating a new task in a task management module, the task management module being used to manage status of the device;
in response to the failure occurring in the device, generating a failure report for the failure;
querying a device object repository with the failure report, the device object repository storing historical failure information associated with the device and a fix solution corresponding to the historical failure information;
obtaining the fix solution from the device object repository based on a comparison between the failure report and the historical failure information;
in response to obtaining the fix solution from the device object repository, fixing the failure according to the fix solution;
re-detecting whether the failure occurs in the device; and
in response to no failure occurring in the device, automatically closing the new task.

14. The computer program product of claim 13, wherein the detecting whether a failure occurs in a device comprises:
in response to generating a new task in a task management module, detecting whether the failure occurs in the device, the task management module being used to manage status of the device.

15. The computer program product of claim 13, wherein the detecting whether a failure occurs in a device further comprises:
obtaining operating status information of the device; and
determining whether the failure occurs in the device based on the operating status information.

* * * * *